(12) United States Patent
Lee et al.

(10) Patent No.: US 6,243,518 B1
(45) Date of Patent: Jun. 5, 2001

(54) OPTICAL FIBER ARRAY CONNECTOR AND METHOD FOR FABRICATING THE SAME

(75) Inventors: Hyung-Jae Lee; Byong-Gwon You, both of Yongin; Tae-Hyung Rhee, Songnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/482,534

(22) Filed: Jan. 14, 2000

(30) Foreign Application Priority Data

Jan. 14, 1999 (KR) ...................................... 99-847

(51) Int. Cl.[7] ...................................................... G02B 6/38
(52) U.S. Cl. .................................. 385/59; 385/54; 385/55
(58) Field of Search .................................. 385/59, 54, 49, 385/50, 52, 63, 65

(56) References Cited

U.S. PATENT DOCUMENTS

| | | | |
|---|---|---|---|
| 5,177,804 | 1/1993 | Shimizu et al. | 385/20 |
| 5,315,678 * | 5/1994 | Maekawa et al. | 385/59 |
| 5,367,593 | 11/1994 | Lebby et al. | 385/53 |
| 5,371,820 | 12/1994 | Welbourn et al. | 385/76 |
| 5,390,267 | 2/1995 | Yanagawa et al. | 385/49 |
| 5,583,958 | 12/1996 | Yanagawa et al. | 385/24 |
| 5,596,662 | 1/1997 | Boscher | 385/55 |
| 5,706,378 * | 1/1998 | Suzuki et al. | 385/49 |
| 5,818,990 | 10/1998 | Steijer et al. | 385/49 |

* cited by examiner

Primary Examiner—Phan T. H. Palmer
(74) Attorney, Agent, or Firm—Robert E. Bushell, Esq.

(57) ABSTRACT

An optical fiber array connector and a method for fabricating the optical fiber array connector are disclosed. The disclosed optical fiber array connector an upper base plate and a lower base plate each being provided at a main surface thereof, in a desired region, with a plurality of first grooves each extending throughout the base plate in a direction corresponding to a longitudinal direction of an optical fiber to be mounted therein, and in regions other than the region where the first grooves are arranged, with a plurality of second grooves each extending throughout the base plate in a direction corresponding to a longitudinal direction of an alignment pin to be inserted therein, the upper and lower base plates being bonded to each other in such a fashion that the first and second grooves of the upper base plate face those of the lower base plate, respectively. A plurality of optical fibers are mounted between the upper and lower base plates in such a fashion that each of them is in contact with associated ones of the facing first grooves of the upper and lower base plates. Tubes are mounted between the upper and lower base plates in such a fashion that each of them is in contact with associated ones of the facing second grooves of the upper and lower base plates, each of the tubes having an insertion hole adapted to receive an alignment pin therein.

25 Claims, 3 Drawing Sheets

OPTICAL FIBER ARRAY CONNECTOR AND METHOD FOR FABRICATING THE SAME

CLAIM OF PRIORITY

This application makes reference to, incorporates the same herein, and claim all benefits accruing under 35 U.S.C. §119 from my application OPTICAL FIBER ARRAY CONNECTOR AND METHOD FOR FABRICATING THE SAME filed with the Korean Industrial Property Office on Jan. 14, 1999 and there duly assigned Serial No. 847/1999.

BACKGROUND OF THE INVENTION

1. Field of the Invention

The present invention relates to an optical fiber array connector and a method for fabricating the same, and more particularly to an optical fiber array connector adapted to couple a plurality of optical fibers together, and a method for fabricating such an optical fiber array connector.

2. Description of the Related Art

One conventional optical fiber array connector includes two base plates each having inclined surfaces at both lateral ends thereof, respectively. Each base plate is provided at one main surface thereof with V-shaped grooves each adapted to mount an optical fiber. The base plates are firmly clamped together by a metal spring in such a fashion that their grooved main surfaces are in contact with each other and that each V-shaped groove of one base plate faces an associated one of the V-shaped grooves of the other base plate to receive one optical fiber therebetween. In the coupled state, the base plates define together 90°-inverted V-shaped recesses at both lateral ends thereof, respectively. Alignment pins are received in the recesses in order to connect the optical fiber array connector with another optical fiber array connector.

In the above mentioned conventional optical fiber array connector, an adhesive is used to bond the base plates to each other and to bond the optical fibers to the base plates. The adhesive may penetrate into the V-shaped recesses in which the alignment pins are inserted, thereby causing an erroneous connection of the optical fiber array connector with another optical fiber array connector.

Another example of a conventional optical fiber array connector includes a connector block made of a plastic material molded in accordance with an injection molding process using a precise mold. The connector block is provided with through holes each adapted to receive an optical fiber therein, and through holes each adapted to receive an alignment pin. Optical fibers are mounted in the through holes while being bonded to the connector block, respectively, whereas alignment pins are inserted into the through holes, respectively, in order to connect the connector block with another optical fiber array connector.

In this optical fiber array connector having the above mentioned configuration, each of the through holes must have a diameter larger than the diameter of an optical fiber in order to receive the optical fiber. For this reason, there may be a gap between each through hole and the optical fiber received therein. In such a case, a coupling loss may be generated between optical fiber array connectors coupled together.

Additional examples of apparatus and methods for connecting or coupling optical fiber arrays are seen in the following U.S. patents. U.S. Pat. No. 5,177,804, to Shimizu et al., entitled Waveguide-Type Optical Switch, describes a planar waveguide-type optical switch with three bases, the bases being aligned with each other using fitting pins passing through pin holes in the bases.

U.S. Pat. No. 5,367,593, to Lebby et al., entitled Optical/Electrical Connector And Method of Fabrication, describes an optical/electrical connector in which one package has ferrules engaged in holes in a base which joins with the package.

U.S. Pat. No. 5,371,820, to Welbourn et al., entitled Optical Hybrid Motherboard Interconnection System And Method Of Assembling Same, describes a hybrid optical motherboard in which metal pins in grooves of a submount of a connector are used to align the connector with another connector.

U.S. Pat. No. 5,390,267, to Yanagawa et al., entitled Optical Fiber/Terminal Connecting Device, describes an optical connecting device in which positioning pins inserted into positioning pin holes are used to align different optical connectors.

U.S. Pat. No. 5,583,958, to Yanagawa et al., entitled Composite Optical Device, describes a composite optical device having two chips which are connected using guide pins inserted into guide pin fitting holes formed from V-grooves in opposing faces of two plates making up the chip.

U.S. Pat. No. 5,596,662, to Boscher, entitled Multichannel Optical Connection Method for Optical Fibers, describes a multichannel optical connection process in which two assemblies are joined using pegs.

U.S. Pat. No. 5,706,378, to Suzuki et al., entitled Method Of Production Of Optical Waveguide Module, describes an optical waveguide chip assembly in which positioning grooves and guide pins are used to align the modules of the assembly.

U.S. Pat. No. 5,818,990, to Steijer et al., entitled Encapsulation Of Optoelectronic Components, describes an optoelectronic component with guide grooves and guide pins for to connecting to another optocomponent.

However, these patents do not solve the above-described problems of penetration of adhesive into recesses for holding alignment pins and of gaps in through holes for the optical fibers.

SUMMARY OF THE INVENTION

Therefore, it is an object of the invention to provide an improved optical fiber array connector, and method of fabricating the optical fiber array connector.

It is a further object of the invention to provide an optical fiber array connector with very little coupling loss.

A yet further object of the invention is to provide an optical fiber array connector in which there is no gap in the through hole for an optical fiber.

A still further object of the invention is to provide an optical fiber array connector in which the recesses for alignment pins are not penetrated by adhesive.

In accordance with one aspect, the present invention provides an optical fiber array connector for connecting optical fiber arrays comprising: an upper base plate and a lower base plate each being provided at a main surface thereof, in a desired region, with a plurality of optical fiber grooves, that is, grooves for holding optical fibs, each extending throughout the base plate in a direction corresponding to a longitudinal direction of an optical fiber to be mounted therein, and in regions other than the region where the optical fiber grooves are arranged, with a plurality of tube grooves, that is, grooves for holding tubes, each extending throughout the base plate in a direction corresponding to a longitudinal direction of an alignment pin to be inserted therein, the upper and lower base plates being bonded to each other in such a fashion that the optical fiber grooves and tube grooves of the upper base plate face those of the lower base plate, respectively; a plurality of optical fibers mounted between the upper and lower base plates in such a fashion that each of them is in contact with associated ones of the facing optical fiber grooves of the upper and lower base plates; tubes mounted between the upper and lower base plates in such a fashion that each of them is in contact with associated ones of the sing tube grooves of the upper and lower base plates, each of the tubes having an insertion hole adapted to receive an alignment pin therein; and an adhesive adapted to bond the upper and lower base plates to each other and to bond the optical fibers and the tubes to the upper and lower base plates.

In accordance with another aspect, the present invention provides a method for fabricating an optical fiber array connector configured to be connected with an optical fiber array connector comprising the steps of: preparing two base plates; etching each of the base plates in such a fashion that the base plate is provided at a main surface thereof in a desired region, with a plurality of optical fiber grooves each extending throughout the base plate in a direction corresponding to a longitudinal direction of an optical fiber to be mounted therein; etching each of the base plates in such a fashion that the base plate is provided at the grooved main surface thereof, in regions other tan the region where the optical fiber grooves are arranged, with a plurality of tube grooves each extending throughout the base plate in a direction corresponding to a longitudinal direction of an alignment pin to be inserted therein; mounting, on one of the base plates, a plurality of optical fibers in such a fashion that each of the optical fibs is partially received in an associated one of the optical fiber grooves of the base plate while being partially protruded from the associated optical fiber groove; mounting, on the optical fiber-mounted base plate, tubes each having an insertion hole adapted to receive an alignment pin therein in such a fashion that each of the tubes is partially received in an associated one of the tube grooves of the base plate while being partially protruded from the associated tube groove; coating an adhesive over the tubes, the optical fibers, and the base plates; bonding the base plates to each other in such a fashion that the protruded portions of the tubes and optical fibers are received in respective grooves of the other base plate; and grinding end surfaces of the resulting structure obtained after completion of the bonding step.

BRIEF DESCRIPTION OF THE DRAWINGS

A more complete appreciation of the invention, and may of the attendant advantages, thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
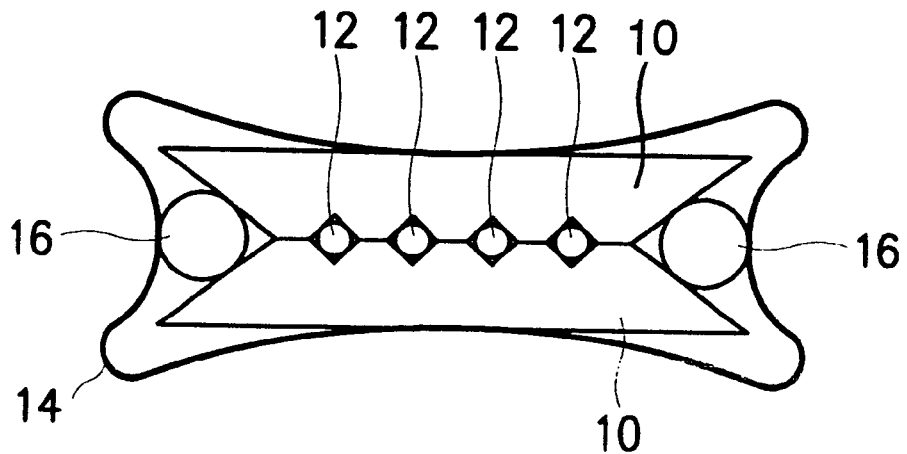
FIG. 1 is a cross-sectional view illustrating an example of conventional optical fiber array connectors.

Turning now to the drawings, FIG. 1 is a cross-sectional view illustrating an example of conventional optical fiber array connectors described above. As shown in FIG. 1, the conventional optical fiber array connector includes two base plates 10 each having inclined surfaces at both lateral ends thereof respectively. Each base plate 10 is provided at one main surface thereof with V-shaped grooves each adapted to mount an optical fiber 12. The base plates 10 are firmly clamped together by a metal spring 14 in such a fashion that their grooved main surfaces are in contact with each other and that each V-shaped groove of one base plate 10 faces an associated one of the V-shaped grooves of the other base plate 10 to receive one optical fiber 12 therebetween. In the coupled state, the base plates 10 define together 90°-inverted V-shaped recesses at both lateral ends thereof respective. Alignment pins 16 are received in the recesses in order to connect the optical fiber array connector with another optical fiber array connector.

In the above mentioned conventional optical fiber array connector, an adhesive is used to bond the base plates 10 to each other and to bond the optical fibers 12 to the base plates 10. The adhesive may penetrate into the V-shaped recesses in which the alignment pins are inserted, thereby causing an erroneous connection of the optical fiber array connector with another optical fiber array connector.

Figure 2:
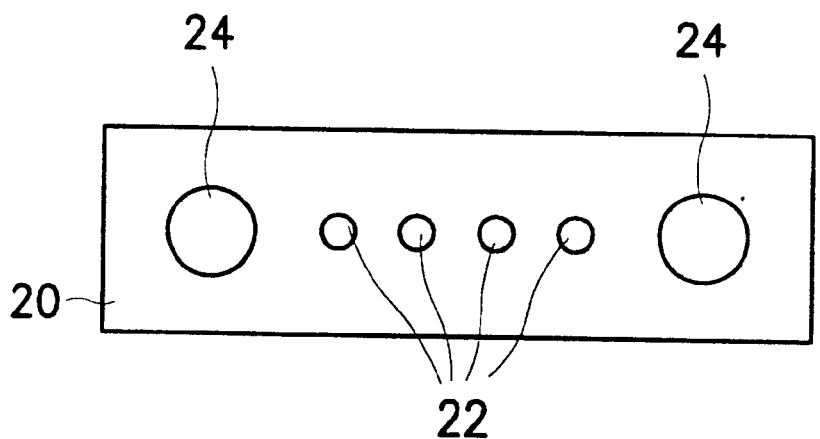
FIG. 2 is a cross-sectional view illustrating another example of conventional optical fiber array connectors.

FIG. 2 is a cross-sectional view illustrating another example of conventional optical fiber array connectors. As shown in FIG. 2, this conventional optical fiber array connector includes a connector block 20 made of a plastic material molded in accordance with an injection molding process using a precise mold. The connector block 20 is provided with through holes 22 each adapted to receive an optical fiber therein, and through holes 24 each adapted to receive an alignment pin. Optical fibers are mounted in the through holes 22 while being bonded to the connector block 20, respectively, whereas alignment pins are inserted into the through holes 24, respectively, in order to connect the connector block 20 with another optical fiber array connector.

In this optical fiber array connector having the above mentioned configuration, each of the through holes 22 should have a diameter larger than the diameter of an optical fiber in order to receive the optical fiber. For this reason, there may be a gap between each through hole 22 and the optical fiber received therein. In such a case, a coupling loss may generated between optical fiber array connectors coupled together.

Hereinafter, respective preferred embodiments of an optical fiber array connector and a method for fabricating the optical fiber array connector in accordance with the present invention will be described.

Figure 3:
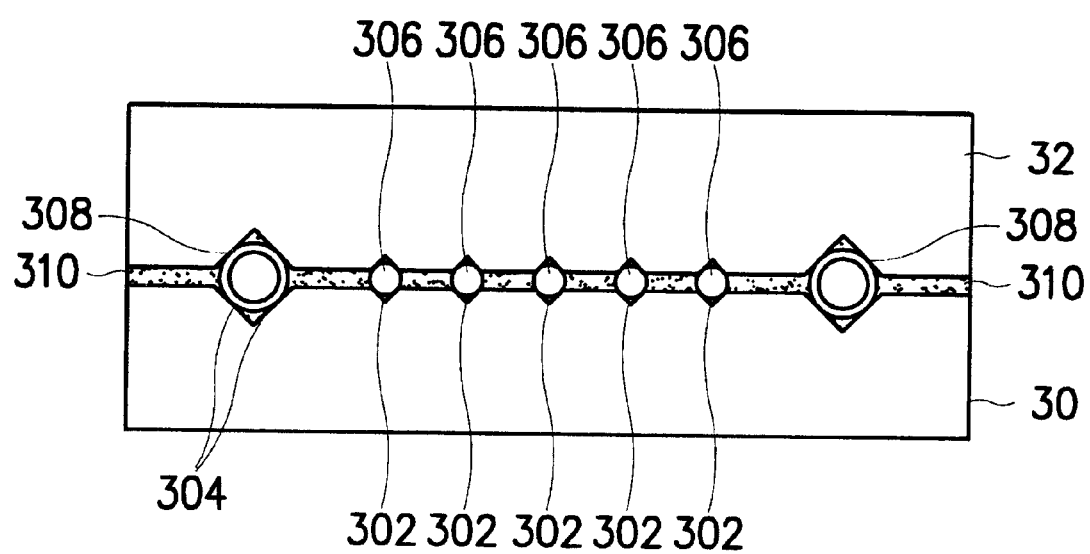
FIG. 3 is a cross-sectional view illustrating an optical fiber array connector in accordance with a preferred embodiment of the present invention.

FIG. 3 is a cross-sectional view illustrating an optical fiber array connector in accordance with a preferred embodiment of the present invention. As shown in FIG. 3, the optical fiber array connector includes a lower base plate 30 and an upper base plate 32. Each of the lower and upper base plates 30 and 32 has a plurality of V-shaped optical fiber grooves 302 arranged on one main surface thereof at the center portion thereof. In the illustrated case, each of the lower and upper base plates 30 and 32 has five V-shaped optical fiber grooves 302. Each of the lower and upper base plates 30 and 32 is also provided with two V-shaped tube grooves 304 arranged on the grooved main surface thereof at regions positioned at opposite sides of the region where the optical fiber grooves 302 are arranged, respectively. Each optical fiber groove 302 extends in a direction corresponding to the longitudinal direction of an optical fiber to be mounted therein. Each tube groove 304 extends in a direction corresponding to the longitudinal direction of an alignment pin to be inserted therein. The lower and upper base plates 30 and 32 are bonded together by an adhesive 310 in such a fashion that the optical fiber grooves 302 and tube grooves 304 of the lower base plate 30 face those of the upper base plate 32, respectively. Five optical fibers 306 are mounted in the facing optical fiber grooves 302 between the lower and upper base plates 30 and 32, respectively, in a state in which they are in contact with the associated optical fiber grooves 302 at outer surfaces thereof, respectively. Two tubes 308 are mounted in the facing tube grooves 304 between the lower and upper base plates 30 and 32, respectively, in a state in which they are in contact with the associated tube grooves 304 at outer surfaces thereof, respectively. The optical fibers 306 and tubes 308 are bonded to both the lower and upper base plates 30 and 32 by the adhesive 310. Each tube 308 has a concentric hole adapted to receive a cylindrical alignment pin (not shown). Preferably, the insertion hole of each tube 308 has a diameter larger than the diameter of the alignment pin by one micron or less.

The optical fiber array connector is firmly clamped by a metal spring (not shown) in a state in which alignment pins (not shown) are partially inserted in the tubes 308, respectively. The alignment pins inserted in the tubes 308 are partied protruded from the tubes 308, respectively. The protruded portions of the alignment pins are adapted to be inserted into the tubes of another optical fiber array connector so that the optical fiber array connectors are coupled together by means of the alignment pins. Since the alignment pins are inserted in the tubes 308 in accordance with the present invention, there is no or little possibility of a penetration of the adhesive into regions where the alignment pins are arranged, respectively. Accordingly, there is no or little possibility of an erroneous connection between optical fiber array connectors. In the above mentioned configuration according to the present invention, there is no or little gap between each optical fiber 306 and the optical fiber grooves 302 receiving the optical fiber 306 because the optical fiber 306 is mounted in the optical fiber grooves 302 between the lower and upper base plates 30 and 32 in a state in which it is in contact with the optical fiber grooves 302 at its surface while being bonded to both the lower and upper base plates 30 and 32 by the adhesive 310. Accordingly, there is no or little coupling loss generated between optical fibers of optical fiber array connectors coupled together.

Figure 4:
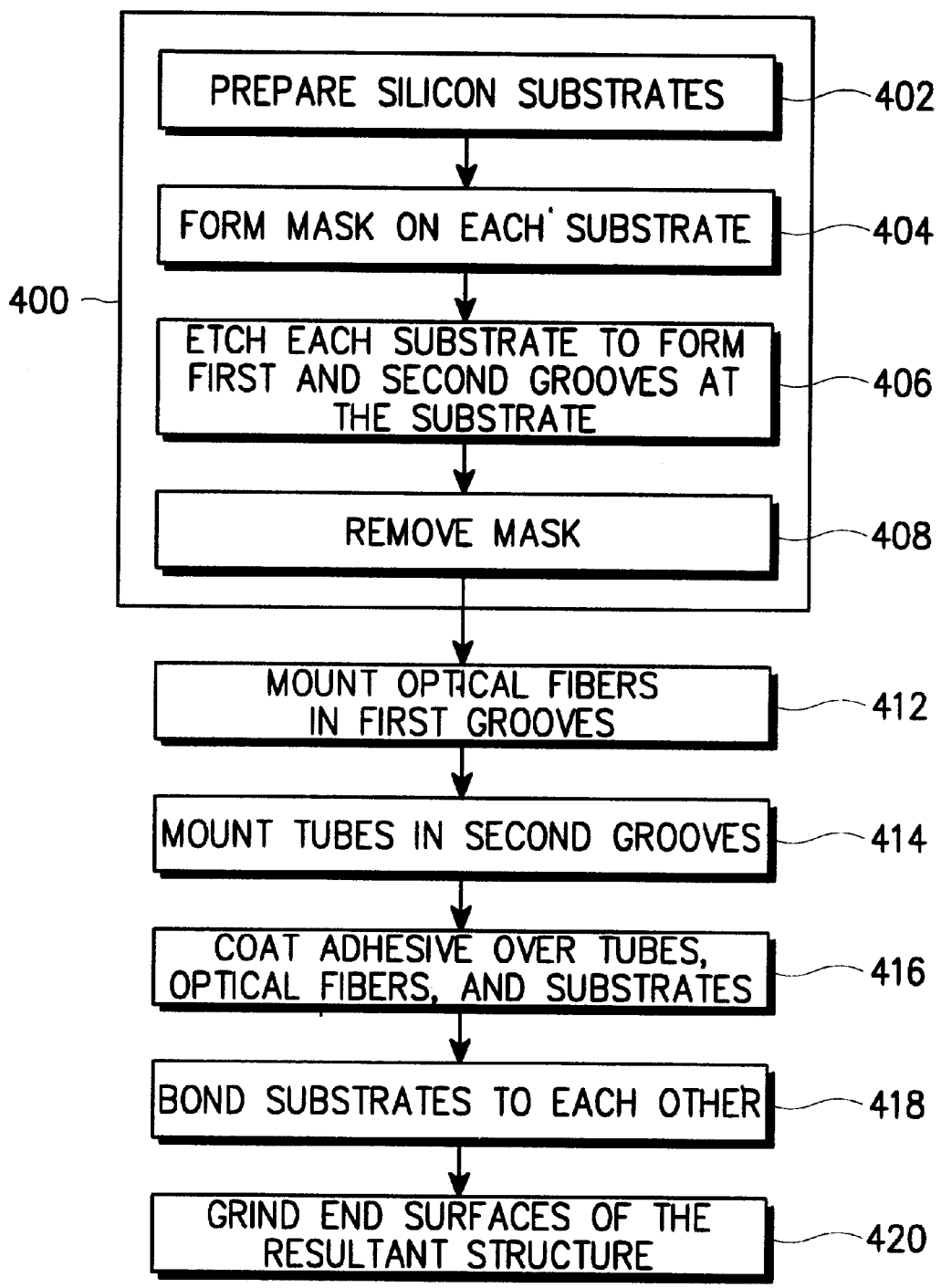
FIG. 4 is a flow chart illustrating essential processing steps of a method for fabricating the above mentioned optical fiber array connector in accordance with a preferred embodiment of the present invention.

FIG. 4 is a flow chart illustrating essential processing steps of a method for fabricating the above mentioned optical fiber array connector in accordance with a preferred embodiment of the present invention. In accordance with the method illustrated in FIG. 4, an etching step 400 is first conducted for two base plates, namely, lower and upper base plates. At the etching step 400, a plurality of, for example, five, V-shaped optical fiber grooves corresponding in number to optical fibers to be mounted between the lower and upper base plates are formed at one main surface of each base plate in a desired region by etching the base plate. Each optical fiber groove is formed to extend in a direction corresponding to the longitudinal direction of the associated optical fiber. Two V-shaped tube grooves corresponding in number to alignment pins to be received therein are also formed at the grooved main source of each base plate in regions other than the region where the optical fiber grooves are arranged, respectively. Each tube groove extends in a direction corresponding to the longitudinal direction of an alignment pin to be inserted therein. The lower and upper base plates are made of a material selected from the group consisting of silicon, glass, ceramic, and plastic, taking into consideration a strength and a flexibility required for those base plates. In the illustrated case, the etching step 400 is achieved by preparing silicon substrates (Step 402), forming a mask on each of the silicon substrates using silicon nitride ($Si_3N_4$) or silica ($SiO_2$) in such a fashion that it covers only a region other than regions where the optical fiber grooves and tube grooves are to be formed, respectively, (Step 404), etching each silicon substrate by use of the mask in accordance with an etching process, for example, a wet etching process conducted in a potassium hydroxide solution, in the regions where the optical fiber grooves and tube grooves are to be formed (Step 406), and finally removing the mask (Step 408). Thereafter, five optical fibers are mounted on the lower upper base plate in such a fashion that they are in contact with the associated V-shaped optical fiber grooves at outer surfaces thereof, respectively (Step 412). Two tubes, each of which has an insertion hole for receiving an alignment pin, are then mounted on the lower base plate in such a fashion that they are in contact with the tube grooves, respectively (Step 414). It is important for each of the tubes to be made of a material exhibiting a superior processability capable of allowing the tube to have a high concentricity, along with an appropriate strength and an appropriate hardness. Preferably, the material of the tubes is made of a material selected from the group consisting of glass, ceramic, metal and plastic. Subsequently, an adhesive is coated over the tubes, optical fibers, and lower and upper base plates (Step 416), and then dried and/or cured in a state in which the lower and upper base plates are bonded together by the adhesive in such a fashion that the tubes and optical fibers partially contacting the optical fiber grooves and tube grooves of the lower base plate come into contact with the optical fiber grooves and tube grooves of the upper base plate at the remaining portions thereof (step 418). The structure obtained after completion of step 418 has rough end surfaces due to the adhesive residual on those end surfaces or a misalignment of the base plates. To this end, the rough end surfaces of the structure are ground using an appropriate process such as a polishing process (Step 420). Thus, an optical fiber array connector according to the present invention is fabricated.

While the present invention has been particularly shown and described with reference to a particular embodiment thereof it will be understood by those skilled in the art that various changes in form and detail may be effected therein without departing away from the scope of the invention as defined by the appended claims. Although the optical fiber grooves have been described as having a V cross-sectional shape in the illustrated case, they may have other cross-sectional shapes in so far as they allow a mounting of cylindrical optical fibers while involving a reduced gap. In the illustrated case, the optical fiber array connector has five optical fiber grooves adapted to mount five optical fibers and two tube grooves adapted to mount two tubes for receiving two alignment pins. However, those skilled in the art will appreciate that reduced or increased numbers of optical fiber grooves, tube grooves and tubes may be used.

As apparent from the above description, when the alignment pins are inserted, the optical waveguide device of the present invention can decrease not only the possibility of erroneous connection owing to the remaining adhesive, but also the connection loss which may occur when the optical fibers are mounted between the connectors.

What is claimed is:

1. An optical fiber array connector for connecting optical fiber arrays, comprising:

an upper base plate and a lower base plate each being provided at a main surface thereof, in a desired region, with a plurality of first grooves each extending throughout the base plate in a direction corresponding to a longitudinal direction of an optical fiber to be mounted therein, and in regions other than the region where the first grooves are arranged, with a plurality of second grooves each extending throughout the base plate in a direction corresponding to a longitudinal direction of an alignment pin to be inserted therein, the upper and lower base plates being bonded to each other in such a fashion that the optical fiber grooves and tube grooves of the upper base plate face those of the lower base plate, respectively;

a plurality of optical fibers mounted between the upper and lower base plates in such a fashion that each of them is in contact with associated ones of the facing first grooves of the upper and lower base plates;

tubes mounted between the upper and lower base plates in such a fashion that each of them is in contact with associated ones of the facing second grooves of the upper and lower base plates, each of the tubes having an insertion hole adapted to receive an alignment pin therein; and an adhesive adapted to bond the upper and lower base plates to each other and to bond the optical fibers and the tubes to the upper and lower base plates.

2. The optical fiber array connector according to claim 1, wherein each of the first and second grooves has a V cross-sectional shape.

3. The optical fiber array connector according to claim 1, wherein each of the upper and lower base plates is made of a material selected from the group consisting of silicon, glass, ceramic, and plastic.

4. The optical fiber array connector according to claim 1, wherein the insertion hole has a circular cross-sectional shape for allowing a cylindrical alignment pin to be inserted therein.

5. The optical fiber array connector according to claim 4, wherein the insertion hole has a diameter larger than a diameter of the alignment pin by one micron or less.

6. The optical fiber array connector according to claim 5, wherein the insertion hole is a through hole being open at both ends thereof.

7. The optical fiber array connector according to claim 4, wherein the insertion hole is a through hole being open at both ends thereof.

8. The optical fiber array connector according to claim 1, wherein each of the tubes is made of a material selected from the group consisting of glass, ceramic, metal, and plastic.

9. The optical fiber array connector according to claim 1, wherein the insertion hole is a through hole being open at both ends thereof.

10. An optical array fiber connector, comprising:

a lower base plate, comprising:
a plurality of optical fiber grooves formed on a central portion of a main surface of the lower base plate, for holding optical fibers; and
two parallel tube grooves formed on said main surface flanking said optical fiber grooves;

a two tubes disposed in the two tube grooves of the lower base plate, said tubes terminating at sides of the lower base plate;

a plurality of optical fibers, one fiber disposed in each of said optical fiber grooves; and an upper base plate having a main surface facing the main surface of the lower base plate and further comprising:
a plurality of optical &a grooves formed on a central portion of the main surface of the upper base plate, for contacting upper portions of said optical fibers; and
two parallel tube grooves formed on said main surface of the upper base plate, flanking said optical fiber grooves of the upper base plate, for contacting upper portions of said two tubes.

11. A method of using the optical fiber array connector of claim 10, comprising the steps of:

partially inserting pins fitting snugly into the bores of the two tubes on one side of the optical wave and device;

inserting the portions of said pins protruding from the two tubes into insertion holes of a second optical fiber array connector; and clamping the two optical fiber array connectors together using a metal clamp.

12. The optical array fiber connector of claim 10, further comprising:

an alignment pin partially inserted into the bore of one of the tubes on one of said sides of the lower base plate.

13. The optical array fiber connector of claim 12, the inner diameter of the bore of said tubes being larger, by less than 1 micron, than the outer diameter of said alignment pin.

14. The optical fiber array connector of claim 10, further comprising adhesive for bonding the optical fibers and tubes to the upper and lower base plates.

15. The optical fiber array connector of claim 10, there being exactly five optical fiber grooves on each of the upper base plate and lower base plate, and exactly five optical fibers.

16. An apparatus comprising the optical fiber array connector of claim 10, and further comprising:

a second optical fiber array connector adjacent to the first optical fiber array connector; and two alignment pins partially inserted into the bores of the tubes of the first and second optical fiber array connectors, for connecting the first and second optical fiber array connectors.

17. The apparatus of claim 16, further comprising a metal spring for clamping the first and second optical fiber array connectors.

18. The optical fiber array connector of claim 10, said optical fibers being extended from a multi-core optical fiber.

19. A method of manufacturing an optical fiber array connector, comprising the steps of:

etching a plurality of optical fiber grooves and two parallel tube grooves flanking the optical fiber grooves on surfaces of each of two substrates to make a lower base plate and an upper base plate, the grooves of the upper base plate facing the corresponding grooves of the lower base plate when the surfaces of the upper base plate and lower base plate face each other;

mounting an optical fiber in each of the optical fiber grooves of the lower base plate;

a mounting a tube in each of the tube grooves of the lower base plate;

coating adhesive over the tubes, optical hers, and surfaces of the lower base plate and upper base plate;

mounting the upper base plate over the tubes and optical fibers on the lower base plate with the optical fiber grooves of the upper base plate engaging the optical fibers and the tube grooves of the upper base plate engaging the tubes, and curing the adhesive, to form an assembled device; and grinding the surfaces on the ends of the assembled device where the optical fibers and tubes contact the ends.

20. The method of claim 19, said step of etching the optical fiber grooves and tube grooves further comprising:

preparing two silicon substrates;

forming a mask on each of the silicon substrates for defining the optical fiber grooves and tube grooves;

etching the unmasked portions of the substrates; and removing the mask.

21. The method of claim 19, said optical fiber grooves and tube grooves being formed as V-grooves.

22. The method of claim 19, said tubes being formed from a material selected from glass, ceramic, metal and plastic.

23. A method for fabricating an optical fiber array connector configured to be connected with an optical fiber array connector comprising the steps of:

preparing two base plates;

etching each of the base plates in such a fashion that the base plate is provided at a main surface thereof, in a desired region, with a plurality of optical fiber grooves each extending throughout the base plate in a direction corresponding to a longitudinal direction of an optical fiber to be mounted therein;

etching each of the base plates in such a fashion that the base plate is provided at the grooved main surface thereof, in regions other than the region where the optical fiber grooves are arranged, with a plurality of second grooves each extending throughout the base plate in a direction corresponding to a longitudinal direction of an alignment pin to be inserted therein;

mounting, on one of the base plates, a plurality of optical fibers in such a fashion that each of the optical fibers is partly received in an associated one of the optical fiber grooves of the base plate while being partially protruded from the associated first groove;

mounting, on the optical fiber-mounted base plate, tubes each having an insertion hole adapted to receive an alignment pin therein in such a fashion that each of the tubes is partially received in an associated one of the second grooves of the base plate while being partially protruded from the associated second groove;

coating an adhesive over the tubes, the optical fibers, and the base plates;

bonding the base plates to each other in such a fashion that the protruded portions of the tubes and optical fibers are received in respective grooves of the other base plate; and grinding end surfaces of the resulting structure obtained after completion of the bonding step.

24. The method according to claim 23, wherein the first and second grooves respectively formed at the steps of etching each of the base plates have a V cross-sectional shape.

25. The method according to claim 23, wherein the insertion hole formed in each of the tubes mounted at the mounting step has a diameter larger than a diameter of the alignment pin by one micron or less.

* * * * *